Aug. 30, 1966    K. DARBY ETAL    3,269,931
METHOD AND APPARATUS FOR REDUCING THE HAZE
NUMBER OF A MINERAL OIL
Filed March 8, 1965    6 Sheets-Sheet 4

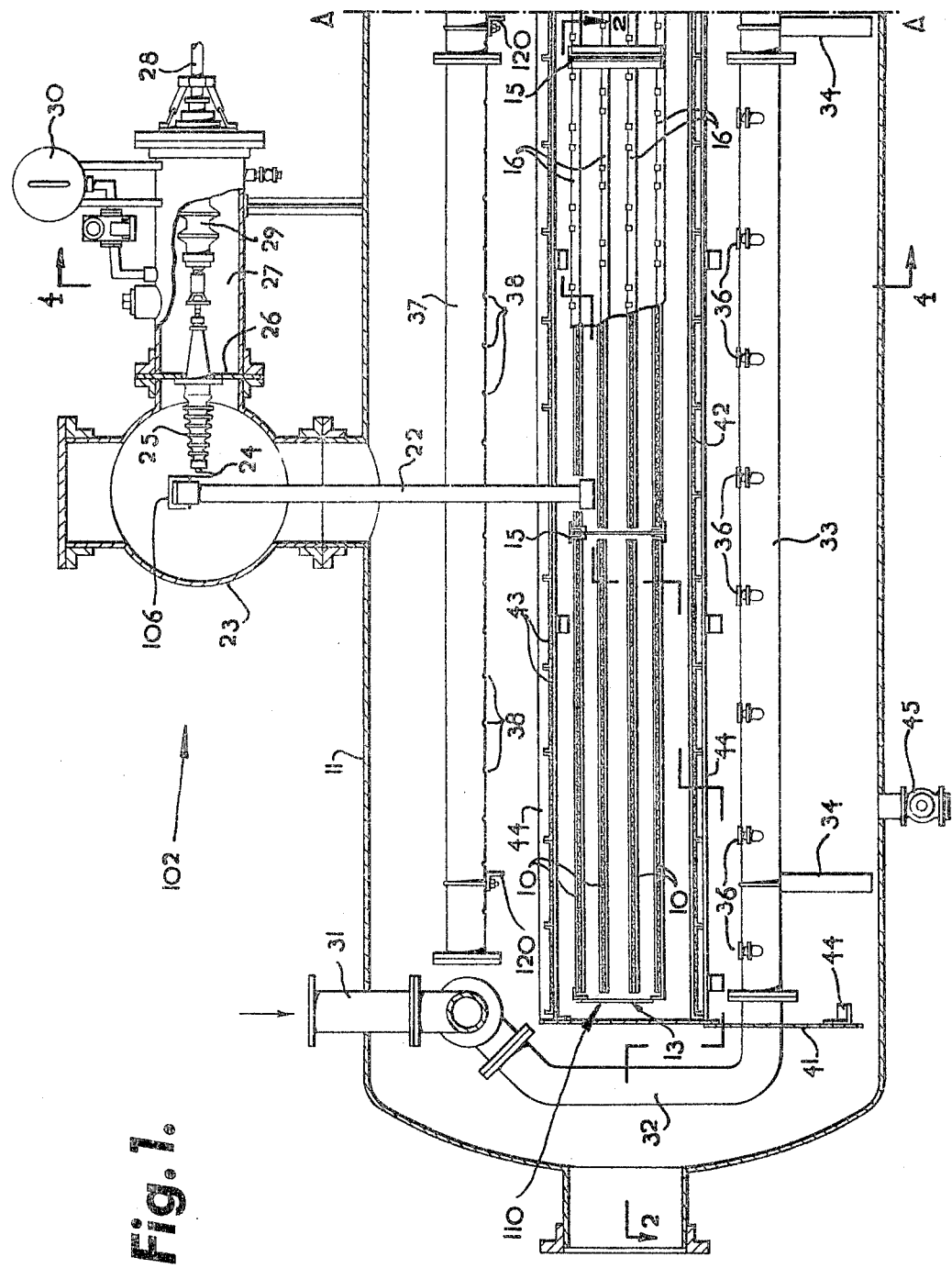

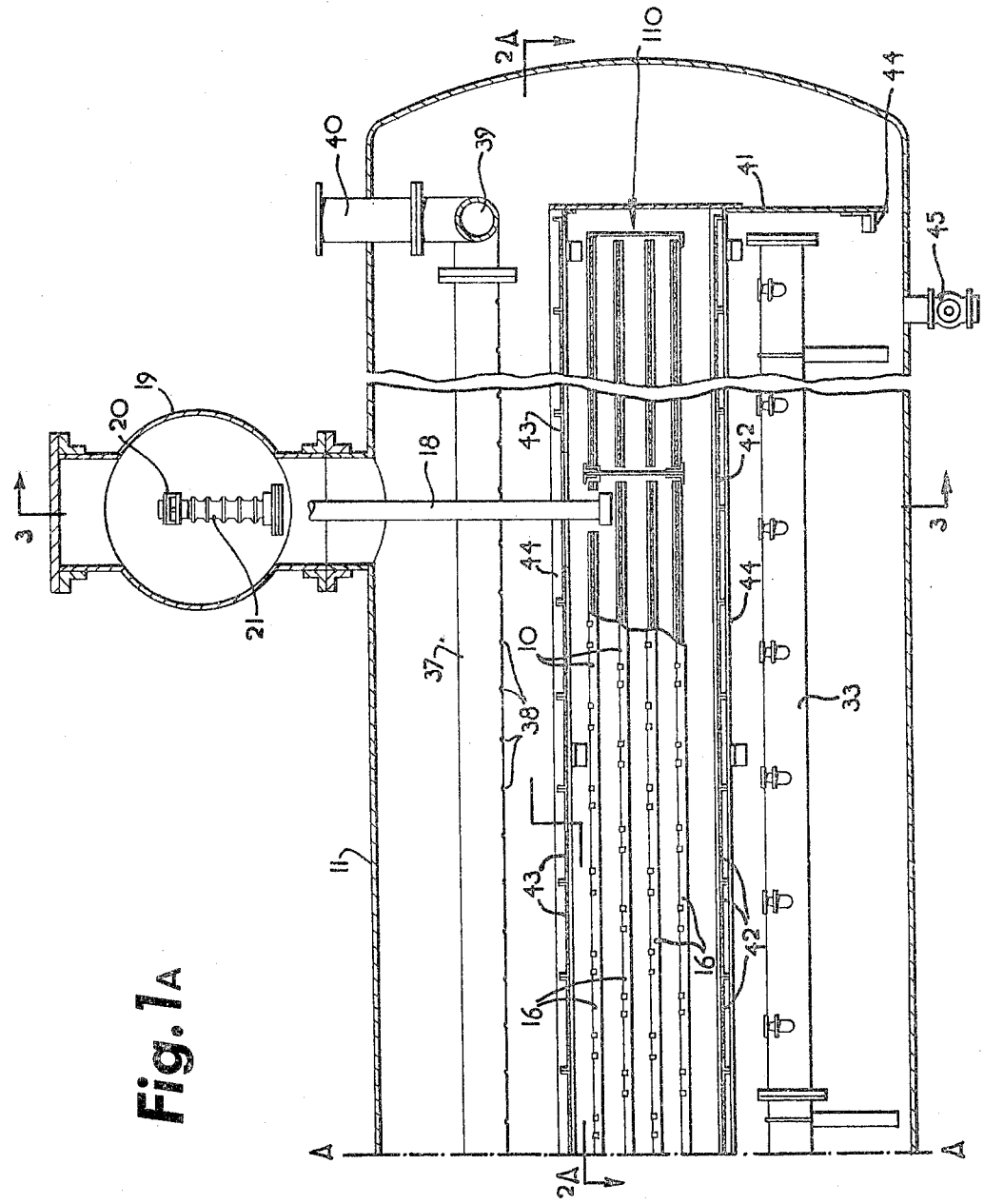

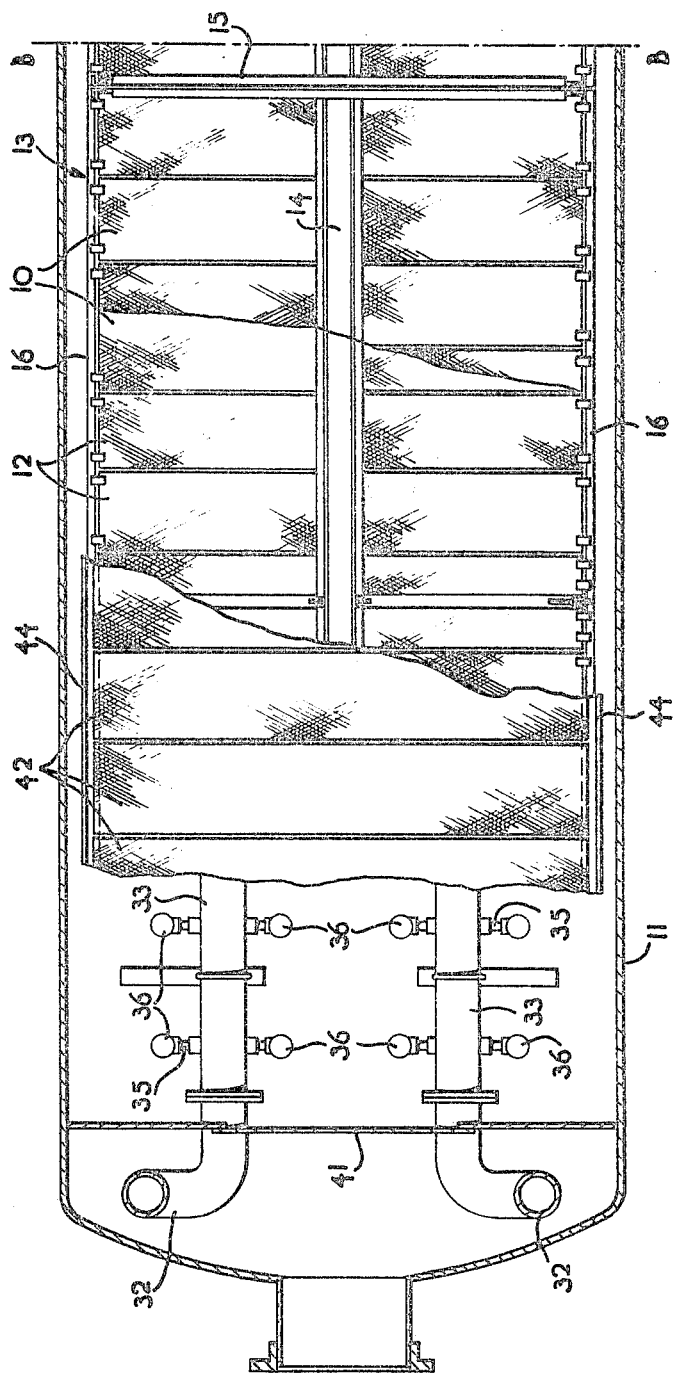

INVENTORS
KENNETH DARBY
HARRY BURTON

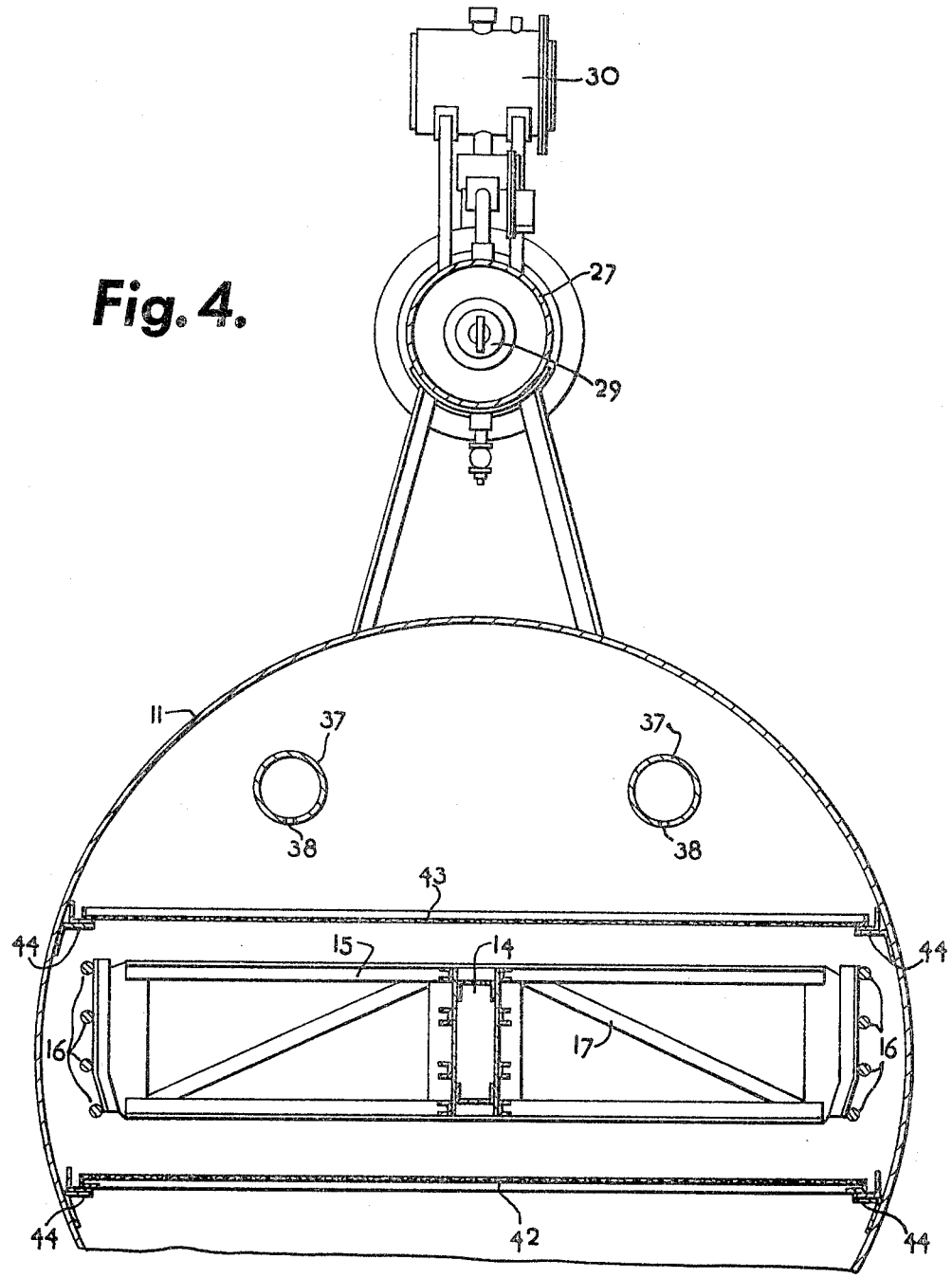

United States Patent Office 3,269,931
Patented August 30, 1966

3,269,931
METHOD AND APPARATUS FOR REDUCING THE HAZE NUMBER OF A MINERAL OIL
Kenneth Darby, Oldbury, and Harry Burton, Birmingham, England, assignors to Lodge-Cottrell Limited, Birmingham, England, a British company
Filed Mar. 8, 1965, Ser. No. 437,738
Claims priority, application Great Britain, Jan. 15, 1958, 1,489/58
4 Claims. (Cl. 204—188)

This application is a continuation-in-part of our copending application Serial No. 212,003, filed July 24, 1962, now abandoned, which is a continuation-in-part of our application Serial No. 783,944, filed December 30, 1958, now abandoned.

The present invention relates to reducing the haze number of a mineral oil.

During or prior to fractionation of a mineral oil, aqueous droplets of approximately colloidal dimensions become dispersed, producing a haze effect in the oil. This haze effect is objectionable in commercial oil since it indicates a lack of complete purity, the trade requiring a clear product free from haze. Haze may be measured by the absorption of light in passing through a layer of the hazy oil of standard thickness relative to the absorption of light in passing through a corresponding layer of clear oil free from haze. The haze number is calculated from the equation:

$$N = 10 \log_{10}\frac{100}{T}$$

where N is the haze number and T is the percentage of transmitted light.

It is an object of the invention to provide an improved method of reducing the haze number of a mineral oil.

It is another object of the invention to provide an improved apparatus adapted for use in reducing the haze number of a mineral oil.

We have found that the haze number of a mineral oil is readily reduced by passing it through a charged electrode structure consisting of a plurality of parallel planar foraminous electrodes all charged to the same high tension direct current potential, the oil passing through each electrode and the electrodes comprising edge portions spaced from adjacent grounded electrode means.

Many electrical methods have been proposed previously for breaking liquid/liquid emulsions and these have been successful, for example, in removing relatively large amounts of water from crude oil. However, they have not proved practicable for removing the small particles involved in the haze effect. Consequently reduction of haze number has previously required large and inconvenient apparatus using, for example, drying salts.

It is surprising that reduction of haze number can be accomplished using a uniformly charged electrode structure; if the structure is replaced by a corresponding structure consisting of alternately charged and grounded electrodes the reduction in haze number is much less effective. We believe that the spacing of the edge portions from adjacent grounded electrode means is also an important feature for success.

An important subsidiary feature involves passing the oil first through a grounded planar foraminous electrode parallel with the electrodes of said charged electrode structure, then through said structure, and then through a further grounded planar foraminous electrode parallel with said first mentioned grounded electrode. Although the grounded electrodes are not essential they are advantageous; we believe that they act to provide quiescent zones outwardly thereof, thus reducing the risk of re-entrainment of coalesced particles.

There now follows a description, to be read with reference to the accompanying drawings, of apparatus embodying the invention. This description is given by way of example of the invention only and not by way of limitation thereof.

In the accompanying drawings:

FIGURE 1 is a sectional view of parts of the apparatus showing one half of a container thereof;

FIGURE 1A is a view corresponding to FIGURE 1 showing the other half of the container;

FIGURE 2 is a section on the line 2—2 of FIGURE 1;

FIGURE 4 is a section on the line 4—4 of FIGURE 1.

Figure 2A:
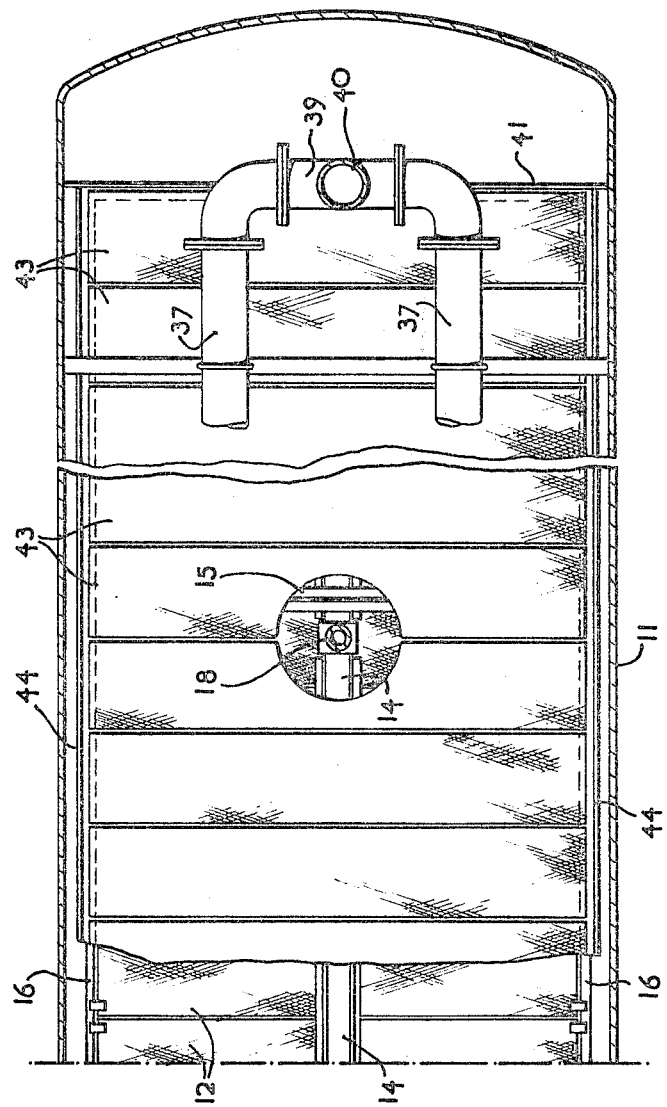
FIGURE 2A is a section on the line 2A—2A of FIGURE 1A.

The apparatus is adapted for use in reducing the haze number of a mineral oil and comprises an elongated horizontal cylindrical container 11 having two horizontal inlet pipes 33 and two horizontal outlet pipes 37, the pipes 33, 37 being arranged for vertical upward flow of oil through the container 11. The apparatus also comprises two vertical baffle plates 41 spaced apart in the container 11 at right angles to its length and an electrode structure 110 in the container 11 between the pipes 33 and the pipes 37 and consisting of four rectangular horizontal planar foraminous electrodes 10 each comprising two longer edge portions each spaced apart from adjacent wall portions of the container 11 (FIGURE 2) and two shorter edge portions each spaced apart from an adjacent one of the baffle plates 41 (FIGURES 1 and 1A). The apparatus further comprises two rectangular horizontal planar foraminous electrodes 42, 43 between the pipes 33 and the pipes 37, the electrode 42 being below the electrode structure 110 and the electrode 43 being above the structure 110. The electrode structure 110 is supported by a framework 13 and the baffle plate 41 and electrodes 42, 43 are supported by horizontal and transverse brackets 44 secured to the container 11. The apparatus comprises means 100 (FIGURE 3) grounding the container 11 and thus the baffle plates 41 and the electrodes 42, 43; the baffle plates 41 and the wall portions of the container 11 thus provide grounded electrode means adjacent the edge portions of the electrodes 10. Each electrode 10 is electrically connected to means 102 (FIGURE 1) for supplying high tension direct current thereto and the electrodes 10 are all charged to the same high tension direct current potential. The apparatus also comprises a pipe 31 for supplying hazy mineral oil to the container; the pipe 31 being connected to the pipes 33 by two pipes 32.

The electrodes 10 are formed of an assembly of expanded metal sheet panels 12 (FIGURE 2) to permit upward passage of the oil being treated. The panels 12 are supported in the framework 13 which comprises a main beam 14 extending lengthwise of the electrodes 10 and transversely of the panels 12, transverse supports 15 extending at spaced intervals from each side of the main beam 14 and, at each end of the transverse supports 15, side supports 16. The framework 13 is braced by diagonal members 17 (FIGURE 4). The panels 12 are supported between the main beam 14 and the side supports 16. There are no grounded electrodes between the electrodes 10. The electrodes 42, 43 are also formed of assemblies of expanded metal sheet panels.

Figure 3:
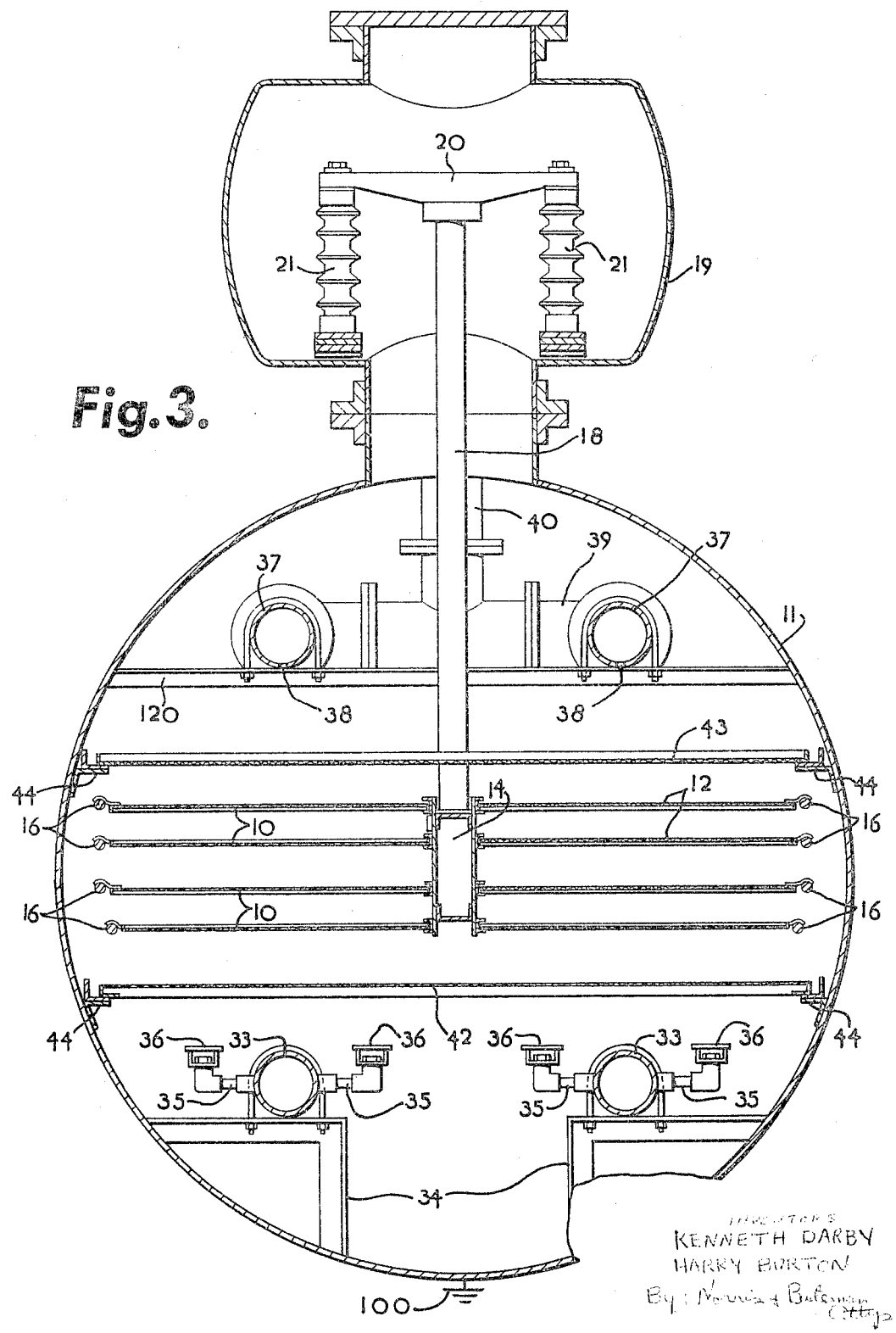
FIGURE 3 is a section on the line 3—3 of FIGURE 1A.

As shown in FIG. 3 and in FIG. 1A, one end portion of the electrode structure 110 is supported in the container 11 by a vertical rod 18 secured at its lower end to the main beam 14 and extending upwardly into a dome 19 and secured at its upper end to a cross beam 20 supported on a pair of insulators 21 which insulate the structure 110 from the container 11. The other end portion of the electrode structure 110 (FIGURE 1) is supported by a vertical rod 22 similarly secured at its lower end to the main beam 14 and extending upwardly into a dome 23 and secured at its upper end to a cross beam 106 supported on a pair of insulators (not shown). The beam 106 is connected to a conductor 24 which extends outwardly from an insulator 25. The conductor 24 and the insulator 25 extend through a wall 26 of the dome 23 into an oil filled extension 27 of the dome 23 in which the conductor 24 is connected to a high tension cable 28 entering the extension through an insulator 29. The extension 27 is filled with insulating oil and the conditions within the extension 27 may be observed by known devices as indicated at 30. In this manner the electrode structure 110 is supplied with the high tension potential.

The pipe 31 (FIGURE 1) extends downwardly through an upper wall portion of the container 11 to join the pipes 32 which extend downwardly in symmetrical relation to the axis of the container 11. Each of the pipes 32 in turn is connected to its pipe 33, the pipes 33 extending lengthwise of the container 11 in symmetrical relation to the axis of the container 11. The pipes 33 are supported by means of supporting brackets 34 secured to the container 11. Each pipe 33 is provided at spaced intervals of its length with sidewise extending outlet tubes 35 (FIGURE 3) turned upwardly at their outer ends and each provided with a distributing head 36. Through this arrangement the oil supplied to the container 11 is distributed uniformly beneath the electrode structure 110. The outlet pipes 37 are also in symmetrical relation to the axis of the container 11 and are provided in their lower surfaces with openings 38. The pipes 37 are supported by means of supporting brackets 120 secured to the container 11. End portions of the pipes 37 adjacent the pipe 31 are closed and the opposite end portions are joined by a pipe 39 which is connected to an off-take pipe 40 extending upwardly through the upper wall portion of the container 11. The vertical baffle plates 41 extend from below the pipes 33 to the electrode 43.

We believe that the electrodes 43, 42 provide quiescent zones above and below the electrode structure 110 for the withdrawal of clarified oil and the settling of coalesced aqueous droplets respectively.

Draw-off outlets 45 are provided in a lower wall portion of the container 11 for the removal of coalesced droplets. The coalesced liquid is withdrawn periodically through these outlets 45.

The spacing of the electrodes 10, 42, 43 may vary somewhat with the character of the oil to be treated, the charging potential and other considerations; generally the spacing dimensions are of the order of a few inches. In the embodiment illustrated in the drawings the spacing was about four and one half inches between electrodes. The spacing of the electrodes 10 from the adjacent container wall portions must be sufficient to prevent sparking.

In the operation of the apparatus, the hazy oil is passed into the container 11 through the pipe 31 to the pipes 33 and thence through the distributing heads 36 to pass upwardly through the electrodes 42, 10, 43. Dispersed droplets are coalesced and settle downwardly to the bottom of the container 11 to be removed. The clarified oil is collected in the pipes 37 and passes outwardly through the pipe 40.

The electrodes may be charged, for example, to a potential between 5 and 50 kilovolts depending upon the character of the oil and other conditions. For example, a potential between 36 and 40 kilovolts may be used in treating a caustic washed hydrofined gas oil.

To illustrate the operation of the apparatus in comparison with apparatus having an electrode structure consisting of alternately charged and grounded electrodes, the results of comparative runs on a pilot apparatus are given below. All tests were made with caustic washed hydrofined gas oil. The haze number was determined at the given temperature. Electrode arrangement No. 1 was with alternate charged and grounded electrodes. Electrode arrangement No. 2 was with the uniformly charged electrodes.

*Results of tests with different electrode systems*

|  | Flow Rate | Temp., °F | Current ma. | Voltage, kv. | Haze, No. |
|---|---|---|---|---|---|
| Electrode Arrangement No. 1 | 100 | 95 | 0.26 | 38 | 4 |
|  | 150 | 95 | 0.26 | 38 | 8 |
| Untreated Feed | | 96 | | | 53 |
| Electrode arrangement No. 2 | 100 | 96 | 0.25 | 40 | 0 |
|  | 150 | 97 | 0.32 | 40 | 0 |
|  | 300 | 96 | 0.32 | 40 | 1 |

The flow rate was in barrels per day.

A full scale plant embodying the invention is capable of handling, for example, about 15,000 barrels per day of hazy oil with a power consumption of only 100 watts.

We claim:

1. A method of reducing the haze number of a mineral oil wherein the oil is passed through a charged electrode structure consisting of a plurality of parallel planar foraminous electrodes all charged to the same high tension direct current potential, the oil passing through each electrode and the electrodes comprising edge portions spaced from adjacent grounded electrode means.

2. A method of reducing the haze number of a mineral oil comprising the steps of (a) passing the oil through a grounded planar foraminous electrode, (b) then through a charged electrode structure consisting of a plurality of planar foraminous electrodes each parallel with said grounded electrode and all charged to the same high tension direct current potential, the oil passing through each electrode of said structure and the electrodes of said structure comprising edge portions spaced from adjacent grounded electrode means, and (c) then through a further grounded planar foraminous electrode parallel with said first mentioned grounded electrode.

3. Apparatus adapted for use in reducing the haze number of a mineral oil comprising (a) a horizontally elongated container having an inlet and an outlet arranged for vertical flow of oil through the container and an outlet for coalesced aqueous droplets, (b) two vertical electrodes spaced apart in the container at right angles to its length, (c) an electrode structure in the container between the oil inlet and the oil outlet consisting of a plurality of rectangular horizontal planar foraminous electrodes each comprising two longer edge portions each spaced apart from adjacent wall portions of the container, and two shorter edge portions each spaced apart from an adjacent one of said vertical electrodes, (d) means for supporting said vertical electrodes and said electrode structure in the container, (e) means grounding the container and the vertical electrodes, (f) means for supplying high tension direct current, electrically connected to each of the electrodes of said structure, (g) means for insulating the electrode structure from the container and the vertical electrodes and (h) means for supplying hazy mineral oil, connected to said inlet.

4. Apparatus adapted for use in reducing the haze number of a mineral oil comprising (a) a horizontally elongated container having an inlet and an outlet arranged for upward vertical flow of oil through the container and an outlet for coalesced aqueous droplets from a lower portion of the container, (b) two vertical electrodes spaced apart in the container at right angles to its length, (c) an electrode structure in the container between the oil inlet and the oil outlet consisting of a plurality of rectangular horizontal planar foraminous electrodes, each comprising two longer edge portions each spaced apart from adjacent wall portions of the container, and two shorter edge portions each spaced apart from an adjacent one of said vertical electrodes (d) two rectangular horizontal planar foraminous electrodes in the container between said oil inlet and said oil outlet, one above and one below said electrode structure, (e) means for supporting said vertical electrodes, said electrode structure and said two horizontal electrodes in the container, (f) means grounding the container, the vertical electrodes and said two horizontal electrodes, (g) means for supplying high tension direct current, electrically connected to each of the electrodes of said structure, (h) means for insulating the electrode structure from the container, the vertical electrodes and the grounded horizontal electrodes, and (i) means for supplying hazy mineral oil, connected to said inlet.

References Cited by the Examiner

UNITED STATES PATENTS

| 2,846,389 | 8/1958 | Downing | 204—302 |
| 2,855,356 | 10/1958 | Stenzel | 204—188 |
| 2,855,359 | 10/1958 | Woelflin | 204—302 |
| 2,963,414 | 12/1960 | Waterman | 204—302 |

H. S. WILLIAMS, *Primary Examiner.*

T. TUFARIELLO, *Assistant Examiner.*